United States Patent
Chan et al.

(10) Patent No.: US 10,470,485 B2
(45) Date of Patent: Nov. 12, 2019

(54) JUICE EXTRACTION DEVICES WITH HOLLOW JUICE EXTRACTION SCREW

(71) Applicant: Golden Choice Products Ltd., Hung Hom, Kowloon (HK)

(72) Inventors: Chung Ming Chan, Hung Hom (HK); Kwan Kit Chan, Hung Hom (HK)

(73) Assignee: Golden Choice Products Ltd., Hung Hom (HK)

(*) Notice: Subject to any disclaimer, the term of this patent is extended or adjusted under 35 U.S.C. 154(b) by 205 days.

(21) Appl. No.: 14/548,716

(22) Filed: Nov. 20, 2014

(65) Prior Publication Data

US 2015/0201668 A1    Jul. 23, 2015

(30) Foreign Application Priority Data

Jan. 20, 2014 (HK) .................... 14100598.0

(51) Int. Cl.
*A23N 1/02* (2006.01)
*A47J 19/02* (2006.01)

(52) U.S. Cl.
CPC .............. *A23N 1/02* (2013.01); *A47J 19/025* (2013.01)

(58) Field of Classification Search
CPC ......... A23N 1/02; A47J 19/025; A47J 19/027; B30B 9/12; B30B 9/128; B30B 9/14
USPC .................... 100/117; 99/510, 513
See application file for complete search history.

(56) References Cited

U.S. PATENT DOCUMENTS

| | | | | |
|---|---|---|---|---|
| 440,074 A | * | 11/1890 | Ihara et al. ............ | B60J 1/2011 296/138 |
| 2,573,585 A | * | 10/1951 | McBean ................. | B30B 9/128 100/117 |
| 3,428,463 A | * | 2/1969 | Sargeant ................... | A23L 2/10 159/4.09 |
| 4,266,473 A | * | 5/1981 | Hunt ........................ | B30B 9/12 100/117 |

(Continued)

FOREIGN PATENT DOCUMENTS

| CA | 1153287 | 9/1983 |
|---|---|---|
| CN | 201029740 | 3/2008 |

(Continued)

OTHER PUBLICATIONS

Translation KR1020140085470.*

(Continued)

*Primary Examiner* — Ibrahime A Abraham
*Assistant Examiner* — Frederick F Calvetti
(74) *Attorney, Agent, or Firm* — Klein, O'Neill & Singh, LLP (57) ABSTRACT

A juice extraction device for extracting juice from food includes a hollow juice extraction screw capable of being rotated along an axis and having a food inlet through which food enters the juice extraction device; a mesh filter for separating the juice from the food, the mesh filter encompassing the juice extraction screw; and a housing encompassing the mesh filter. The provision of a hollow juice extraction screw can minimize the length of the device while maintaining juicing efficiency. This feature also allows the device to be placed vertically, such that various components, including the juice exit, may be located at the bottom position for improved efficiency and convenience.

8 Claims, 7 Drawing Sheets

(56) References Cited

U.S. PATENT DOCUMENTS

| | | | | |
|---|---|---|---|---|
| 4,440,074 A * | 4/1984 | Ihara | A47J 19/025 | 100/117 |
| 4,614,153 A * | 9/1986 | Kurome | A47J 19/027 | 99/511 |
| 5,222,430 A * | 6/1993 | Wang | A47J 19/027 | 241/282.1 |
| 5,392,699 A * | 2/1995 | Tai | A47J 19/027 | 241/37.5 |
| 5,421,248 A * | 6/1995 | Hsu | A47J 19/027 | 241/282.1 |
| 5,738,003 A * | 4/1998 | Lang | A23F 5/265 | 100/112 |
| 5,924,357 A * | 7/1999 | Chen | A47J 43/0716 | 210/360.1 |
| 6,360,655 B1 * | 3/2002 | Crespo Barrio | B09B 3/0025 | 100/110 |
| 8,091,473 B2 * | 1/2012 | Kim | A47J 19/025 | 99/510 |
| 2006/0021520 A1 | 2/2006 | Hsu | A47J 19/027 | 99/511 |
| 2006/0141113 A1* | 6/2006 | Kimmel | A23L 2/04 | 426/481 |
| 2006/0191425 A1* | 8/2006 | Chang | A47J 19/027 | 99/511 |
| 2009/0049998 A1* | 2/2009 | Kim | A47J 19/06 | 99/510 |
| 2009/0229478 A1* | 9/2009 | Wu | A23N 1/02 | 99/495 |
| 2012/0137899 A1* | 6/2012 | Kim | A47J 19/027 | 99/509 |
| 2013/0074708 A1* | 3/2013 | Asbury | A23N 1/02 | 99/513 |
| 2013/0125768 A1* | 5/2013 | Shi | A23L 11/07 | 99/513 |
| 2013/0284034 A1* | 10/2013 | Jeong | A47J 19/025 | 100/117 |
| 2013/0327232 A1* | 12/2013 | Charles | A23N 1/02 | 99/510 |
| 2014/0053741 A1* | 2/2014 | Chou | A47J 19/06 | 99/513 |
| 2014/0283693 A1* | 9/2014 | Raude | A47J 19/025 | 99/513 |
| 2015/0101495 A1* | 4/2015 | Backus | A47J 19/027 | 99/511 |
| 2015/0164129 A1* | 6/2015 | Kim | A47J 19/02 | 99/513 |
| 2015/0264972 A1* | 9/2015 | Delavaud | A23N 1/02 | 99/513 |
| 2015/0320104 A1* | 11/2015 | Lee | A47J 19/027 | 99/495 |
| 2016/0120354 A1* | 5/2016 | Kim | A47J 43/07 | 99/513 |

FOREIGN PATENT DOCUMENTS

| | | | |
|---|---|---|---|
| CN | 101849762 | | 10/2010 |
| CN | 102342735 | | 2/2012 |
| CN | 102362778 | | 2/2012 |
| CN | 102813442 | | 12/2012 |
| CN | 202739656 | * | 2/2013 |
| CN | 203106743 | | 8/2013 |
| CN | 203106743 U | | 8/2013 |
| CN | 203314716 | | 12/2013 |
| GB | 2417884 | | 3/2006 |
| KR | 20110047593 | | 8/2011 |
| KR | 1020140018058 | * | 4/2012 |
| KR | 20120004880 | | 7/2012 |
| KR | 1020130065406 | * | 12/2013 |
| KR | 20140018058 | * | 2/2014 |
| TW | 201249379 | | 12/2012 |

OTHER PUBLICATIONS

Translation KR 1020130065406.*
Combined Search and Examination Report from UK Intellectual Property Office for corresponding UK Application No. GB1500072.2.
International Preliminary Report on Patentability from International Bureau of WIPO dated Jul. 26, 2016 for corresponding PCT Application No. PCT/CN2014/089816.
International Search Report from State Intellectual Property Office of the P.R. China dated Jan. 16, 2015 for corresponding PCT Application No. PCT/CN2014/089816.
Written Opinion from State Intellectual Property Office of the P.R. China dated Jan. 16, 2015 for corresponding PCT Application No. PCT/CN2014/089816.
Examination Report from UK Intellectual Property Office dated Jun. 17, 2015 for corresponding UK Application No. GB1500072.2.
Extended European Search Report from EPO dated Jul. 17, 2017 for related European Application No. 14878748.4.

* cited by examiner

JUICE EXTRACTION DEVICES WITH HOLLOW JUICE EXTRACTION SCREW

CROSS-REFERENCE TO RELATED APPLICATION

This application claims priority from Hong Kong Application No. 14100598.0, filed on Jan. 20, 2014, the disclosure of which is incorporated herein by reference in its entirety.

BACKGROUND

This disclosure relates to juice extraction device for extracting juice from food, particularly those operate at about 40-300 rounds per minute, or so called "slow juicers", more particularly so called "vertical masticating juicers".

A juice extraction device is a kind of home appliance for extracting juice from food, such as fruits, herbs, leafy greens, vegetables and the like. Currently there are three types of commercial juice extraction devices, namely, (1) centrifugal juicers run at high speed, typically above 10,000 RPM; (2) masticating juicers; and (3) triturating juicers, both of the latter types known as slow juicers operated at relatively slow speed in the region of lower hundreds RPM. It is believed that low speed juicing processes could avoid oxidation, which could damage or destroy enzymes contained in juice, and thus it is believed that low speed juicing could preserve the nutrition and flavor of juice. Masticating juicers use a profiled screw style molding to compact and crush fruit and vegetable matters against meshes, allowing juice to flow through the meshes while filtering the fruit and vegetable solids. The current invention is directed to such masticating juicers.

Masticating juicers can be broadly classified into two major variants based on the mechanical alignment of the profiled screw. These two variants are: (1) the horizontal variant, where the profiled screw is aligned horizontally; and (2) the vertical variant, where the profiled screw is aligned vertically. The horizontal profiled screw typically is a helical screw in a cylindrical shape, whereas the vertical profiled screw is a slanted conical helix screw with an extended cutter blade at the top tip end. There is one common feature that all commercial available vertical masticating juicers exhibit: Food enters at a first position, and the extracted juice and food residue separately discharge at another second position, where the first position is higher than the second position. The two discharge points, for the juice and the residue, are generally roughly at the same elevation. The residue is often still juicy with substantial juice contents.

It is desirable to provide a juice extraction device having improved juice extraction efficiency with relatively low manufacturing complexity.

SUMMARY

An object of this disclosure is to provide a juice extraction device with improved juice extraction efficiency and/or with relatively low manufacturing complexity compared to the same type of the juice extraction devices of the prior art.

Accordingly, this disclosure describes a juice extraction device for extracting juice from food which includes:
  a hollow juice extraction screw capable of being rotated along an axis and having a food inlet through which the food enters the juice extraction device;
  a mesh filter for separating the juice from the food, the mesh filter encompassing the hollow juice extraction screw; and
  a housing encompassing the mesh filter.

The food inlet may be unified with the hollow juice extraction screw, or alternatively, the food inlet can be a separate part from the hollow juice extraction screw.

Food may enter the food inlet from a first end and exit from a second end opposing the first end along a first direction, after which the food is moved along the mesh filter along a second direction opposing the first direction. Additionally, the juice extraction device further includes a food recycling conduit positioned in proximity to the first end for allowing the food to re-enter the food inlet. The juice extraction device may further include a residue exit for allowing residue to exit from the juice extraction device and connecting to the food recycling conduit, and a switch for closing at least one of the residue exit and the food recycling conduit. The first end may be positioned upward from the second end such that the axis is vertical.

The juice extraction may further include a juice exit for allowing juice to exit from the juice extraction device, wherein the juice exit is positioned in proximity to the second end. Additionally, the mesh filter has a unified mesh filter bottom at the second end.

The food inlet may further include at least one blade at the second end. Additionally, at least a portion of the blade can be made of metal for cutting the food.

The above summary does not provide an exhaustive list of inventive concepts. Other inventive concepts may be present from different features or elements or different combinations of features or elements described herein. In particular, the above optional features or elements can be incorporated into any technical solutions of the current disclosure in any combinations desired.

BRIEF DESCRIPTION OF THE DRAWINGS

Preferred embodiments of the present disclosure will now be explained by way of example and with reference to the accompanying drawings in which.

DETAILED DESCRIPTION

This disclosure is now presented by way of examples with reference to the figures in the following paragraphs. Objects, features, and aspects of the present disclosure are disclosed in or are apparent from the following description. It is to be understood by one of ordinary skilled in the art that the following discussion is a description of exemplary embodiments only, and is not intended as limiting the broader aspects of the present disclosure, which broader aspects are embodied in the exemplary constructions. List 1 is a list showing the parts and respective reference numerals in the figures.

List 1

| Reference numeral | Part name |
| --- | --- |
| 100 | Juice extraction device |
| 200 | Housing |
| 202 | Juice exit |
| 204 | Residue exit |
| 300 | Juice extraction mechanism |
| 302 | Mesh filter |
| 304 | Mesh filter bottom |
| 306 | Mesh filter alignment hole |
| 310 | Hollow juice extraction screw |
| 312 | Blade |
| 314 | Hollow juice extraction screw driver connector |
| 320 | Food inlet |
| 322 | Switch |
| 324 | Food recycling conduit |
| 400 | Push rod |
| 500 | Driver housing |
| 502 | Juice container |
| 504 | Residue container |
| 506 | Driver |

Figure 1:
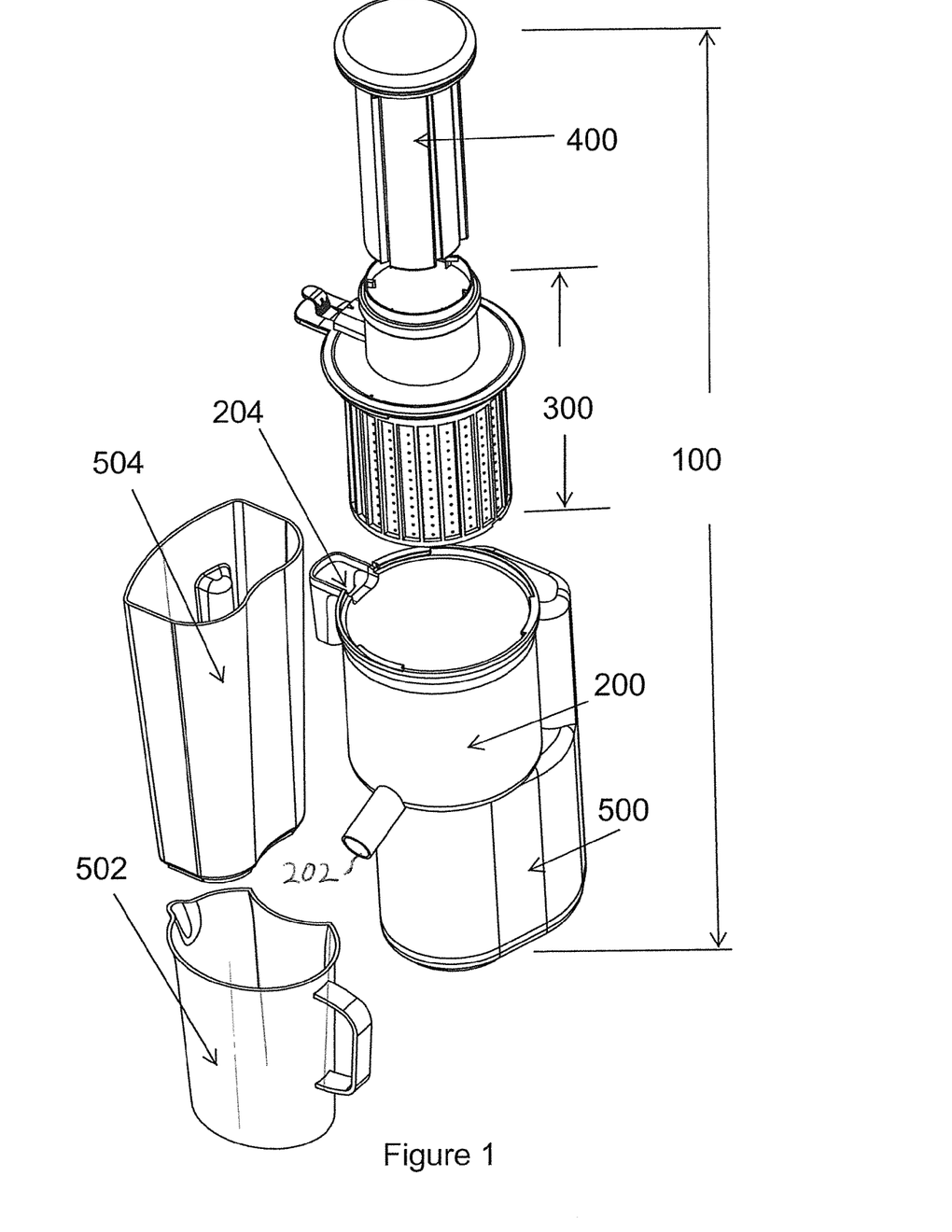
FIG. 1 shows an exploded view of an exemplary juice extraction device of the present disclosure.
Figure 2:
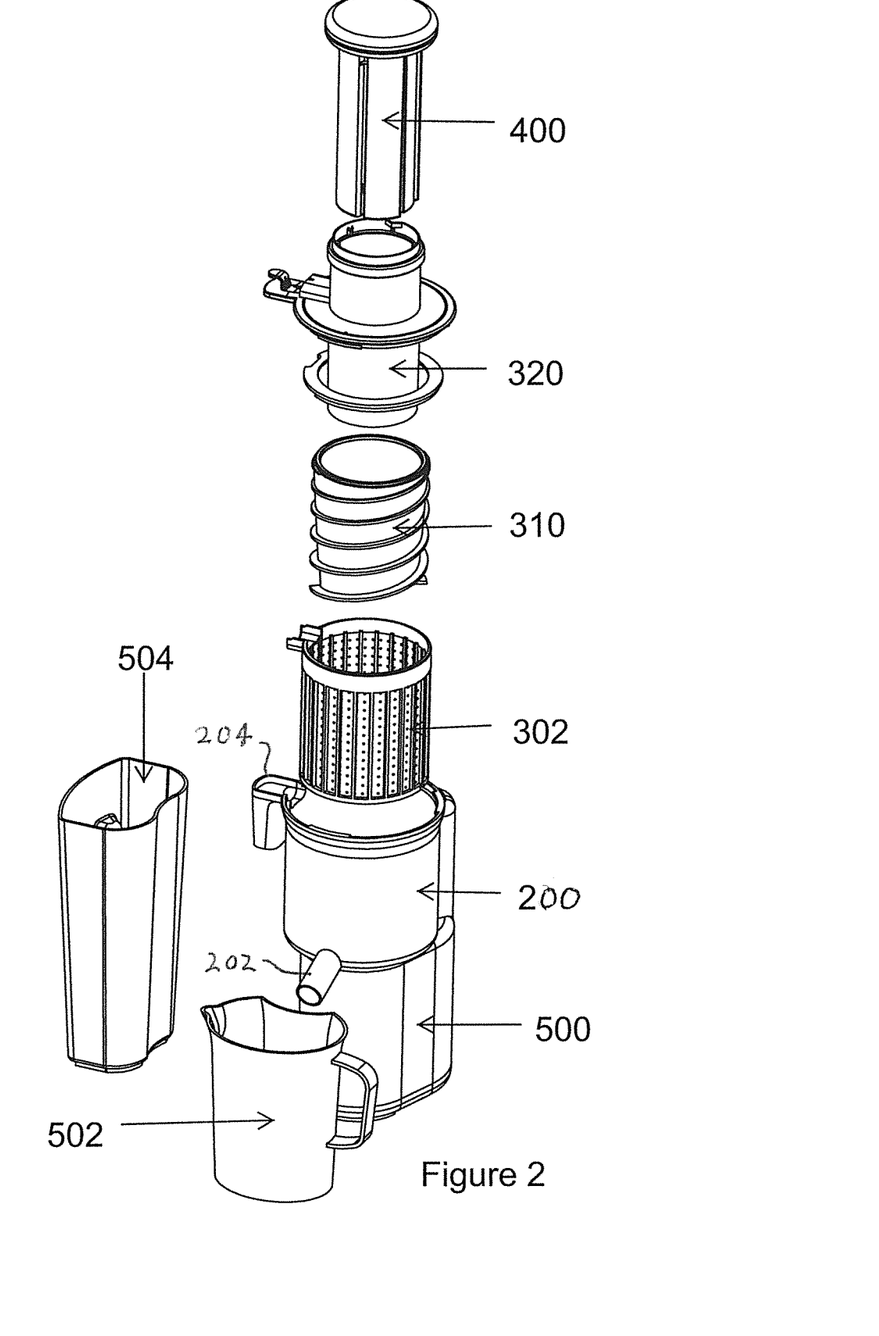
FIG. 2 shows a further exploded view of the juice extraction device of FIG. 1 with the exploded view of the juice extraction mechanism.

An exemplary juice extraction device 100 in accordance with this disclosure is shown in FIGS. 1 and 2. The juice extraction device 100 has a juice extraction mechanism 300 for extracting juice from food, the juice extraction mechanism 300 being encompassed by a housing 200. The housing 200 has a juice exit 202 from which juice extracted from the food exits, and a residue exit 204 from which the remnant remaining after juice extraction exits. Details of the juice extraction mechanism 300 will be described below. An optional push rod 400 is shown, and is used to push food into the juice extraction mechanism 300. At the bottom of the housing 200, an optional driver housing 500 housing the driver 506 (shown in FIG. 4) is provided, which can also be used to provide support to the housing 200 on a flat surface, like table top. The driver 506 is optional and the juice extraction device 100 can be driven by hand if desired. An optional juice container 502 for holding juice that exits from the juice exit 202, and an optional residue container 504 for holding residue that exits from the residue exit 204 are also shown in FIG. 1.

Figure 3:
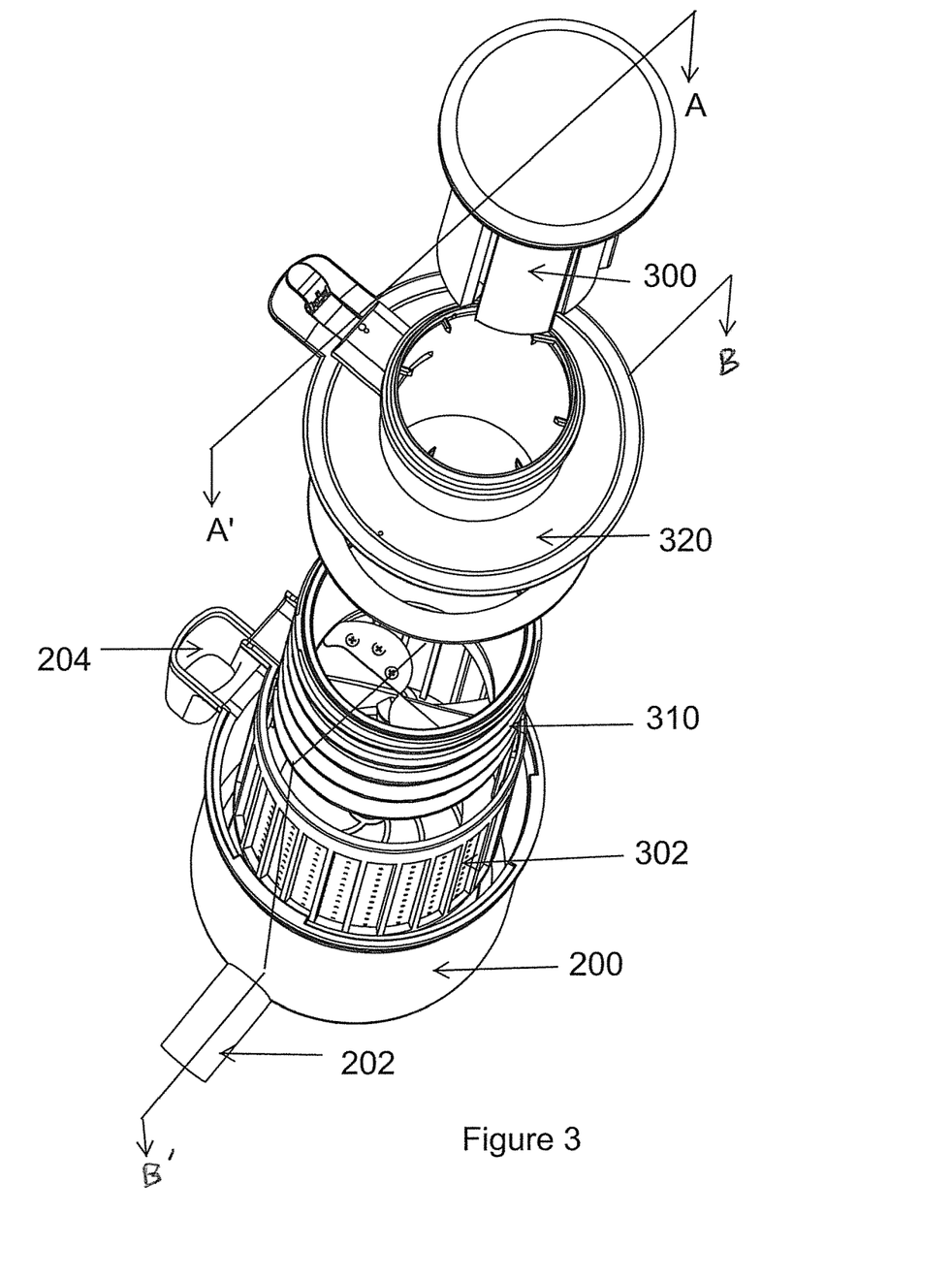
FIG. 3 shows another exploded view of the juice extraction device of FIG. 2.

Further exploded views of the juice extraction mechanism 300 are shown in FIGS. 2 and 3. In this particular embodiment shown in FIGS. 2 and 3, the juice extraction mechanism 300 has a mesh filter 302 encompassing a hollow juice extraction screw 310. The mesh filter 302 is responsible for separating the juice from the food. The hollow juice extraction screw 310 is capable of being rotated by the driver 506 connected thereto along the vertical (Z) axis, and has a food inlet 320 through which food enters the juice extraction device 300, more specifically to reach the mesh filter 302, for which the entrance can be assisted by the optional push rod 400. The food inlet 320 is shown and preferred to be a separate part from the hollow juice extraction screw 300 in this particular embodiment. However, the food inlet 320 can be unified with the juice extraction screw 310, but is less preferred, as a unified food inlet 320 would have to rotate with the hollow juice extraction screw 300, and thus extra load is added to the driver 506 that may reduce juicing efficiency.

Although it is preferred that the juice extraction screw 310 is generally cylindrical in shape due to simplicity, it is not necessarily so, and other shapes can be used, such as a wedge shape, as long as the screw is hollow. Naturally, if the juice extraction screw 310 is of a shape different from cylindrical shape, the shapes of the housing 200, the mesh filter 302 and the food inlet 320 have to be adjusted accordingly.

Figure 4:
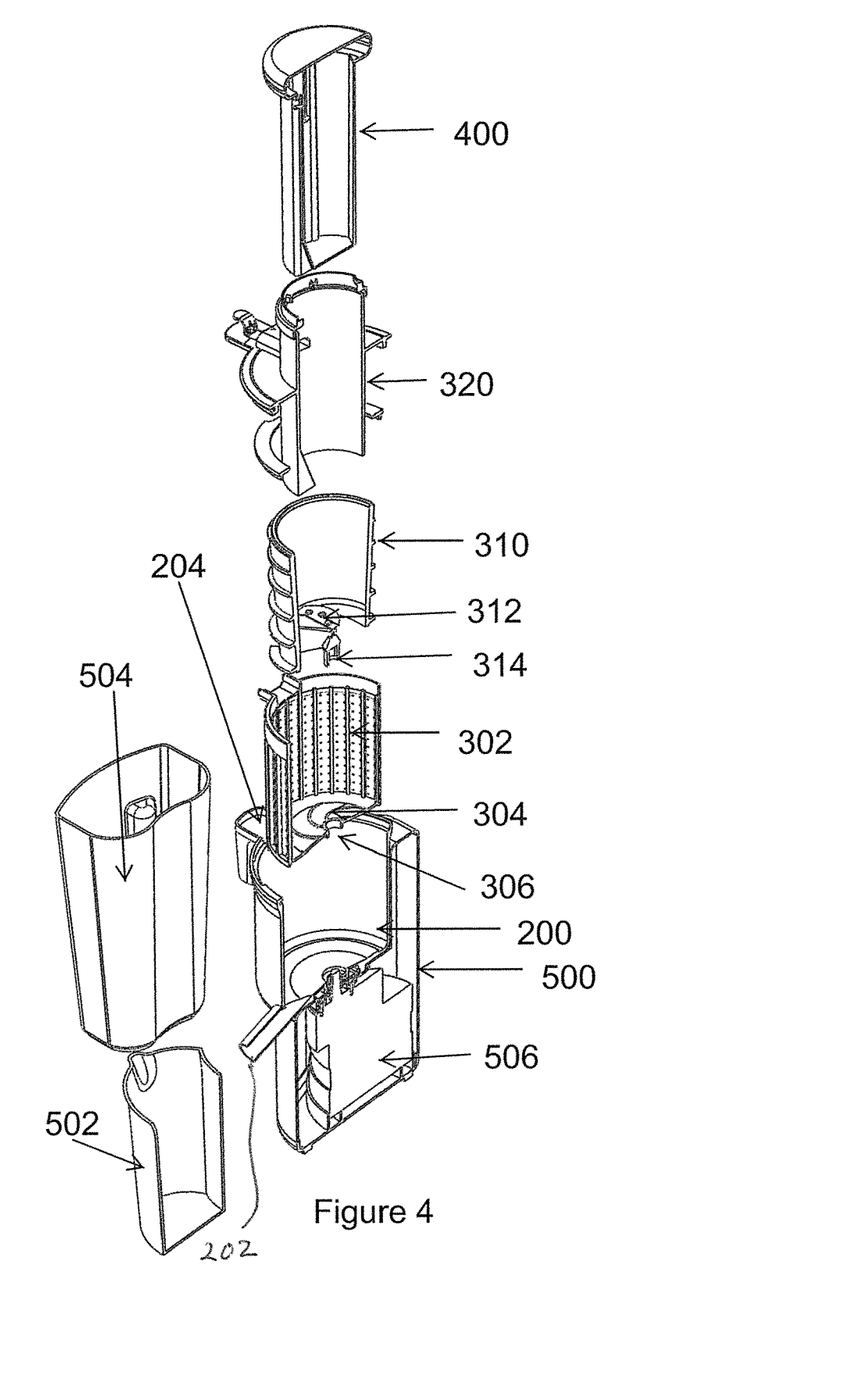
FIG. 4 shows a cross sectional view of the juice extraction device along the lines A-A' and B-B' in FIG. 3.

In FIG. 4, more details of various components of the juice extraction device 100 are shown by the cross sectional view along the lines A-A' and B-B' in FIG. 3. It can be seen that the mesh filter 302 has a mesh filter bottom 304 with spiral protrusions or grooves, which protrusions or grooves, as known in the art, are used to "guide" food to move during the juice extraction process when the hollow juice extraction screw 310 rotates. The mesh filter bottom 304 may be unified or integrally formed with the mesh filter 302. To provide more available juice extraction area from the mesh filter 302, the mesh filter bottom 304 is provided at the bottom of this preferred embodiment. This is also the end where the juice exit 202 is placed. The mesh filter 302 also has a mesh filter alignment hole 306 through which the hollow juice extraction screw 310 connects the driver 506 via a hollow juice extraction screw driver connector 314.

In FIG. 4, the hollow juice extraction screw 310 is shown to have an optional blade 312 at the bottom, that is, the end where the juice exit 202 is placed so as to reduce the total length of the juice extraction mechanism while maintaining the juice extraction efficiency. Placing the blade 312 at the bottom can provide extra distance from the user in comparison to placing the cutting blade at the top, without increasing the overall length of the juice extraction mechanism 300. This can allow the option to use metal blades, which can cut food more efficiently and effectively, in comparison to plastic blades that are generally used by currently available vertical masticating juicers due to safety considerations, without extending the length of the path of food entrance, that is the length of the hollow juice extraction screw 310, and therefore the height of the juice extraction device 100.

The operation of the juice extraction process is explained as follows: Food enters the juice extraction device 100 through the food inlet 320 at the top or the first end, and exits from the bottom or the second end in FIGS. 1, 2, and 4. The second end opposes the first end along a first direction, that is, from the top to the bottom in FIGS. 1, 2, and 4. The food is cut by the blade 312 if such is available, and then reaches the mesh filter bottom 304. As the hollow juice extraction screw 310 rotates, food is moved along the mesh filter in a second direction opposing the first direction, that is, upwards in FIGS. 1, 2, and 4. During the process, juice is extracted or separated from the food. The juice extraction device is preferred to be vertically placed, that is, the hollow juice extraction screw 310 has a vertical axis of rotation.

The juice exit 202, the mesh filter bottom 304, and the blade 312 are all positioned in proximity to the bottom (second) end, of the juice extraction device 100 in FIG. 4. For the juice exit 202, such placement at the bottom may allow collection of more juice due to gravity. For the mesh filter bottom 304 and the blade 312, such placements can reduce the overall length and therefore the size of the juice extraction device 100 due to reasons explained above.

Figure 5A:
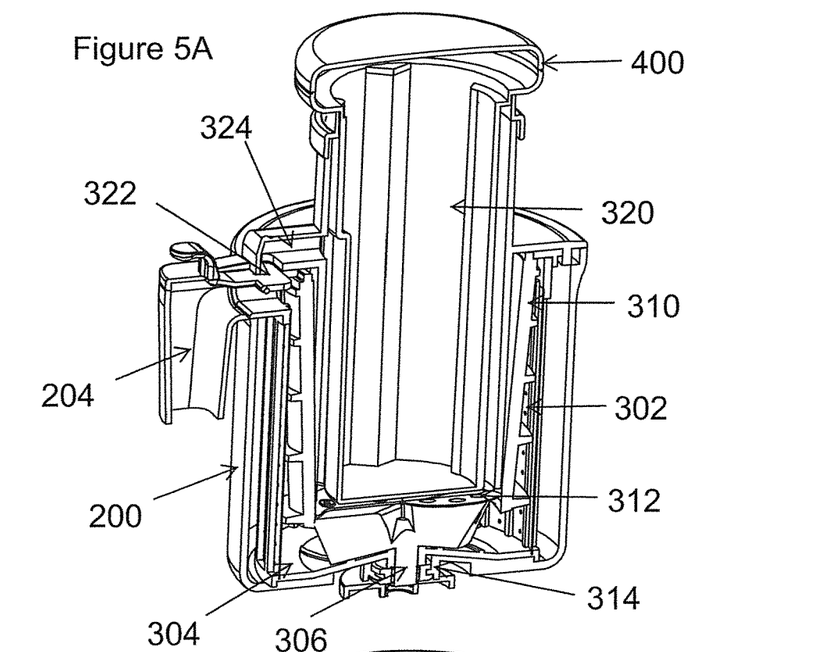
FIGS. 5A & 5B show cross sectional views of the juice extraction mechanism with the opening and closing of the switch related to the food recycling exit and the residue exit.
Figure 5B:
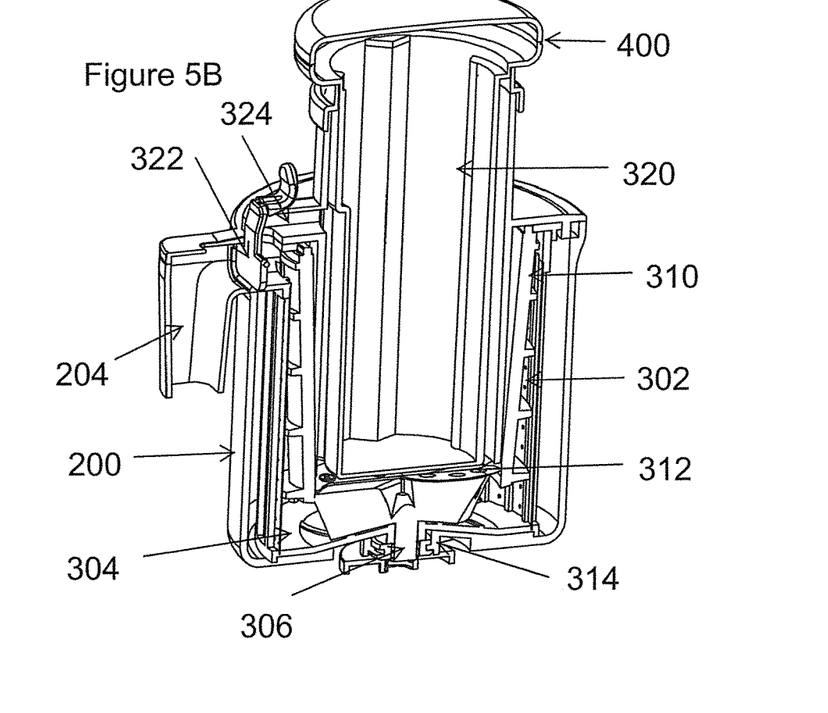
Figure 6A:
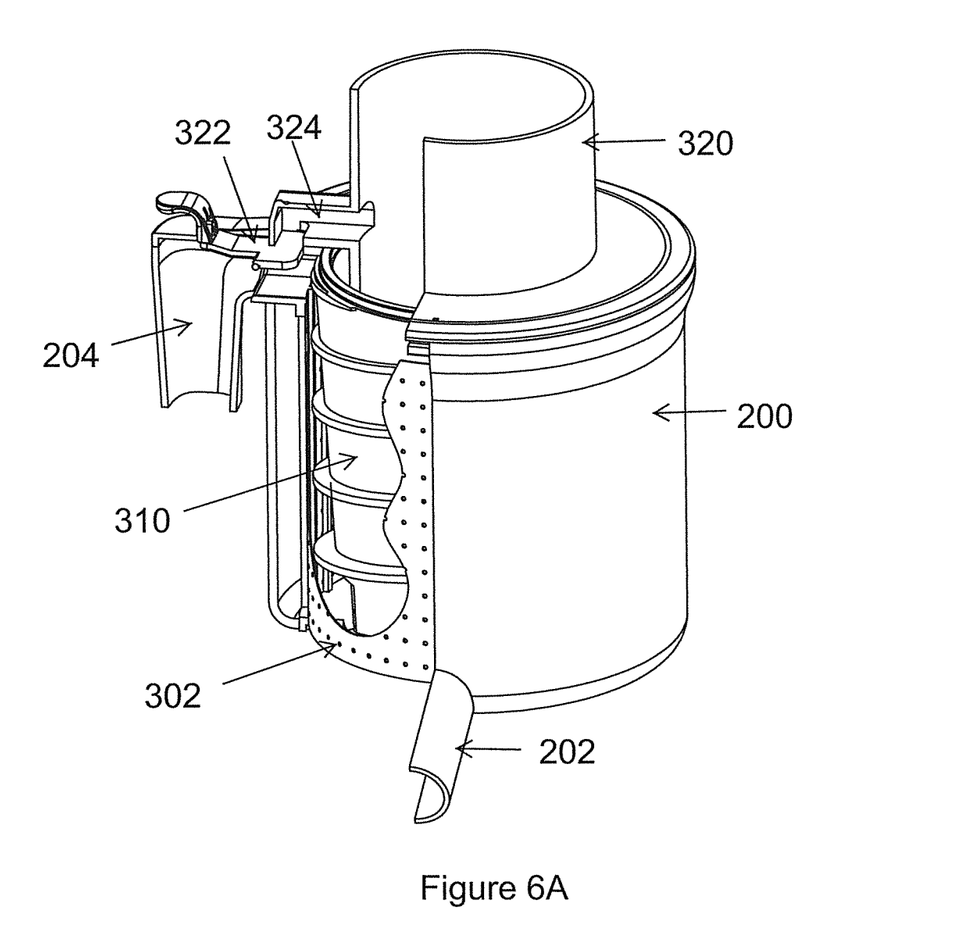
FIGS. 6A & 6B show partial cutaway views of the juice extraction mechanism with the opening and closing of the switch related to the food recycling exit and the residue exit without showing the push rod.
Figure 6B:
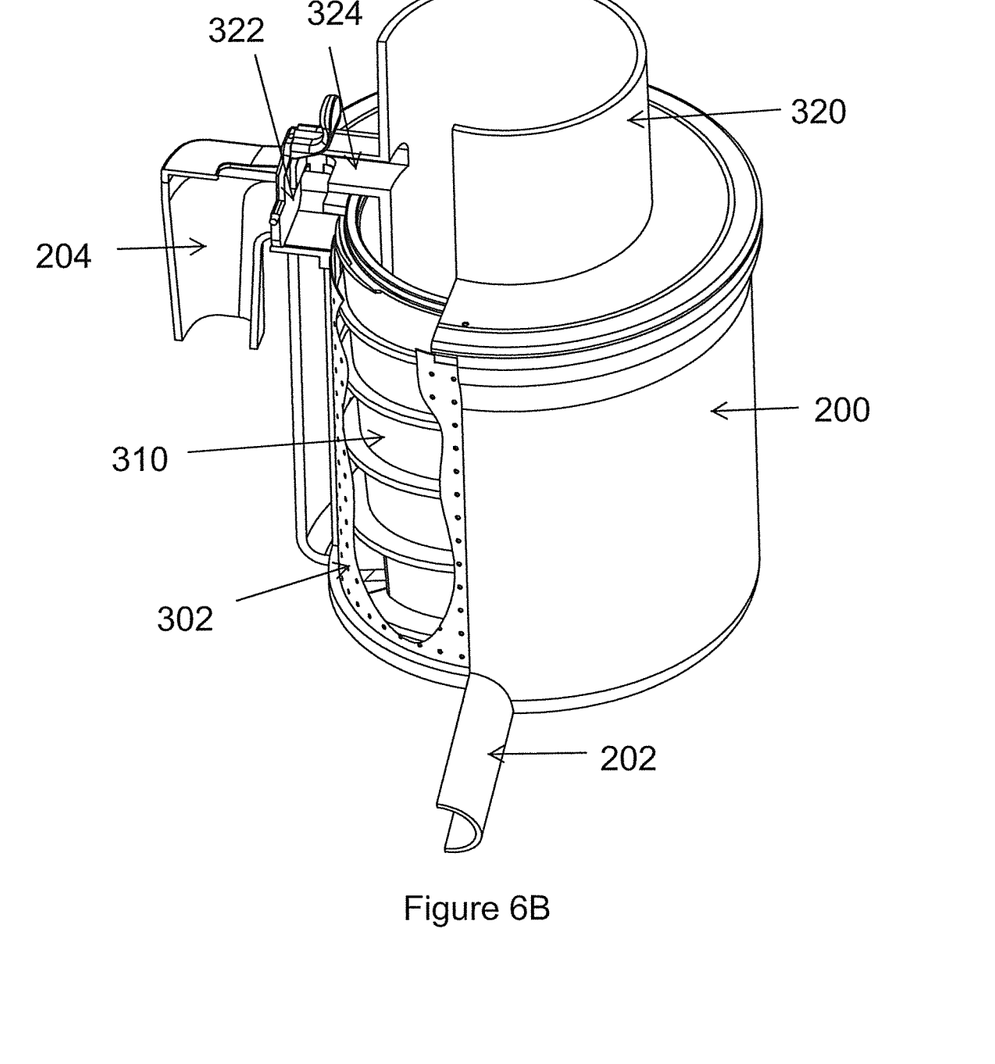

Such vertical placement of the juice extraction device 100 also allows an additional advantageous feature, in that such vertical placement allows the optional provision of a food recycling conduit 324 to be placed in proximity to the top (first) end, of the juice extraction device 100. This is preferred so that food can be recycled relatively easily by movement due to gravity. To control the recycling, the food recycling conduit 324 is connected to the residue exit 204, and a switch 322 is further provided to close at least one of the residue exit and the food recycling conduit. In FIGS. 5A and 6A, the switch 322 is opened to the residue exit 204 such that residue can exit from the residue exit 204 without recycling. In FIGS. 5B and 6B, the switch 322 is opened to the food recycling conduit 324 such that food can re-enter the food inlet 320 for recycling. When the switch 322 is opened to the food recycling conduit 324, closed-loop juice extraction can be achieved. The juice extraction device 100 makes use of the volumetric displacement feature of the hollow juice extraction screw 310 and relatively simple re-alignment of the mechanical configuration to achieve residue recycling capability.

While preferred embodiments of the present disclosure have been described in detail by the examples, it is apparent that modifications and adaptations will occur to those skilled in the art. Furthermore, the above-described embodiments shall not be interpreted to be restricted by the examples or figures only. It is to be expressly understood, however, that such modifications and adaptations are within the scope of the present disclosure, as set forth in the following claims. For instance, features illustrated or described as part of one embodiment can be used on another embodiment to yield a still further embodiment. Thus, it is intended that the present disclosure cover such modifications and variations as come within the scope of the claims and their equivalents.

What is claimed is:

1. A juice extraction device for extracting juice from food, comprising:
    an externally-threaded juice extraction screw that is rotatable around a vertical axis, the juice extraction screw being hollow between an open top end and an open bottom end;
    a food inlet at the open top end of the juice extraction screw and configured to allow entry of food into the open top end of the juice extraction screw;
    a stationary mesh filter encompassing the juice extraction screw and configured to separate juice from the food exiting from the open bottom end of the container;
    a housing encompassing the mesh filter so as to receive the juice separated from the food by the mesh filter; and
    a food outlet in the housing configured to receive the food after the juice is separated therefrom by the filter.

2. The juice extraction device of claim 1, wherein the mesh filter has a unified mesh filter bottom adjacent the open bottom end of the juice extraction screw.

3. The juice extraction device of claim 1, wherein the juice extraction screw has at least one blade at the open bottom end.

4. The juice extraction device of claim 3, wherein at least a portion of the blade is made of metal.

5. The juice extraction device of claim 1, wherein the juice extraction screw is configured so that rotation of the juice extraction screw along the vertical axis moves the food entering the open top end of the juice extractions screw in a first direction toward the open bottom end of the juice extraction screw, and then along the mesh filter in a second direction opposing the first direction.

6. The juice extraction device of claim 1, wherein the housing includes a juice exit positioned in proximity to the open bottom end of the juice extraction screw.

7. The juice extraction device of claim 1, further comprising a food recycling conduit positioned in proximity to the open top end of the juice extraction screw so as to direct the food moving in the second direction to re-enter the food inlet.

8. The juice extraction device of claim 7, further comprising:
    a residue exit positioned proximate the food recycling conduit and configured to direct food residue to exit from the juice extraction device after the separation of the juice; and
    a switch operable for selectively closing at least one of the residue exit and the food recycling conduit.

* * * * *